C. F. GODDARD.
COMPOUND BRAKE LEVER FOR VEHICLES.
APPLICATION FILED SEPT. 28, 1915.
1,186,511.
Patented June 6, 1916.
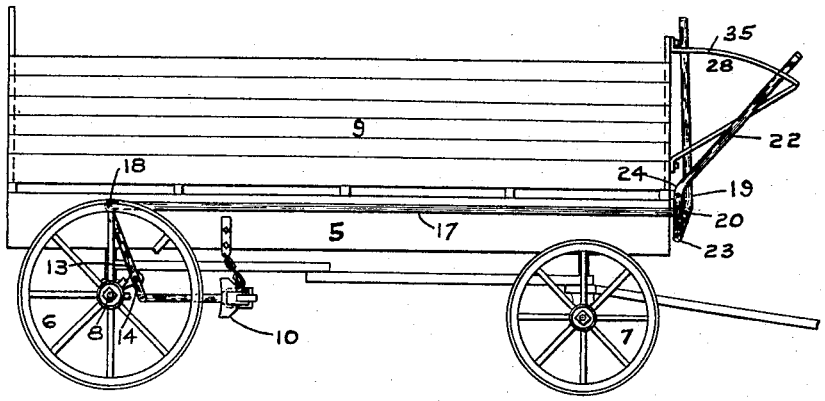
Fig. 3.
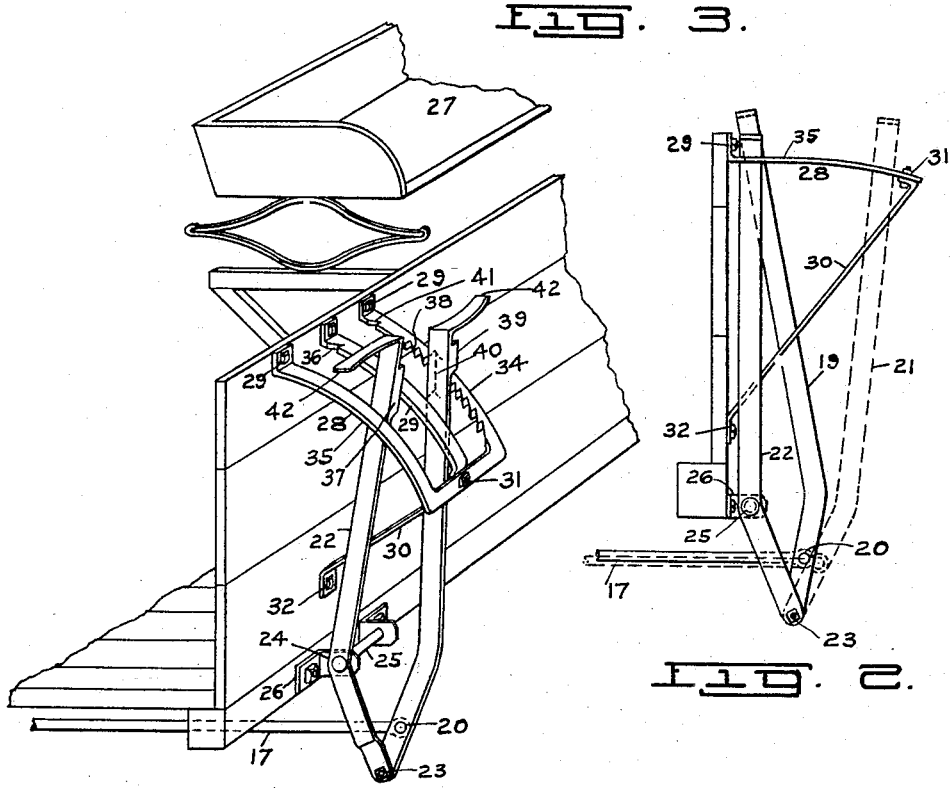
Fig. 1.
Fig. 2.
WITNESSES:
Burt R. Judd
Pauline L. Powell
INVENTOR.
Charles F. Goddard
BY
J. W. Powell
ATTORNEY

UNITED STATES PATENT OFFICE.

CHARLES F. GODDARD, OF WINDSOR, COLORADO, ASSIGNOR TO ACME PATENT AND DEVELOPMENT COMPANY, OF WINDSOR, COLORADO, A CORPORATION OF COLORADO.

COMPOUND BRAKE-LEVER FOR VEHICLES.

1,186,511.  Specification of Letters Patent.  Patented June 6, 1916.

Application filed September 28, 1915. Serial No. 53,082.

*To all whom it may concern:*

Be it known that I, CHARLES F. GODDARD, a citizen of the United States, and a resident of Windsor, county of Weld, State of Colorado, have invented certain new and useful Improvements in Compound Brake-Levers for Vehicles, of which the following is a full, clear, and exact description, such as will enable others skilled in the art to make and use the same, reference being had to the accompanying drawing, forming a part hereof.

The invention relates to improvements in means for operating vehicle brakes, and the invention has for its object the provision of means for operating a vehicle brake, which means is simple and positive in operation and insures an effective application of the brake and a wide clearance of the brake shoe from the wheel of the vehicle when the brake is not in use.

Another object of the invention is to provide means for retaining the brake shoe in a position relatively close to the periphery of the wheel, whereby comparatively little movement is necessary to effect the application of the brake shoe to the wheel.

Another object of the invention is to provide means for quickly, effectively and firmly applying the brake.

With these and other objects in view, the invention will now be described with reference to the accompanying drawing.

In this drawing, Figure 1 is a perspective view of the invention, showing the same applied to the vehicle; Fig. 2 is an elevation view of the brake levers, showing in full lines the position of the levers when the brake shoe is held in a position relatively close to the wheel; Fig. 3 is a side view of a vehicle, showing the brake mechanism applied thereto and the position of the compound levers when the brake shoe is in its relatively wide clearance position.

Corresponding and like parts are referred to in the following description and indicated in all the views of the accompanying drawing by the same reference characters.

Let the numeral 5 designate a wagon, the same being of the beet rack type used for transporting beets from the field to what is commonly known as the beet dump. Such wagons are ordinarily specially constructed in so far as the body portion thereof is concerned. However, the form of wagon or vehicle will make no difference, as the invention may be applied to any form of vehicle.

The numeral 6 designates one of the rear wheels of the vehicle and the numeral 7 one of the front wheels thereof.

8 represents the rear axle of the vehicle and 9 the body of the vehicle, the body being shown in the drawing as of the type used for hauling beets. The numeral 10 represents a brake shoe of ordinary form, the same being movably mounted in the ordinary way and having the usual lever 13 fulcrumed on the rear axle of the vehicle, as shown at 14. The ordinary rod 17 extends parallel with the wagon body, its rear extremity being pivotally connected with the upper extremity of the lever 13, as shown at 18, while its forward extremity is pivotally connected with a lever 19, as shown at 20. This lever 19 is one of the operating levers, and is fulcrumed at its lower extremity to the lower extremity of another operating lever 22, as shown at 23. The operating lever 22 is provided with an angle therein, as shown at 24, said lever being fulcrumed on a fulcrum pin 25 in the corner of the angle. The fulcrum pin 25 is supported on the body of the vehicle by means of a bracket 26. The operating levers 19 and 22 occupy positions at an angle to the rod 17 and extend upwardly adjacent the front end of the vehicle body, whereby they are in convenient position to be operated by the foot of the driver of the vehicle, who occupies the seat 27.

A sector 28 is secured to the front end of the body of the vehicle, the said sector being formed of a metal frame, the upper extremity of which is secured to the body of the vehicle, as shown at 29, while its lower extremity is connected with the body of the vehicle by means of a brace 30, one extremity of which is secured to the sector 28, as shown at 31, while the lower extremity of said brace is secured to the body of the vehicle, as shown at 32. The frame of the sector 28 is formed of side members 34 and 35, which extend parallel with each other, and a centrally located parallel member 29, forming a part of said sector, is disposed between the levers 19 and 22. The central member 29 is provided with a notch 36, close to its upper extremity, adapted to receive a flange 37, with which the lever 22 is provided, whereby said lever is held against movement in the sector 28. When the operating lever 22 is held in this position in the notch 36, the brake shoe 10 occupies a position relatively close to the wheel 6, ready to be applied by the operation of the lever 19, as will later be explained. The member 34 of the sector 28 is provided with a plurality of notches 38, which engage with a flange 39, formed on the lever 19, for holding the latter in any predetermined position against rearward movement. The lever 19 is also provided with another flange 40, adapted to engage in a notch 41 formed close to the upper extremity of the member 34, whereby the lever 19 is held against forward movement. Now, assuming that both operating levers 19 and 22 are in the positions represented in full lines in Fig. 2, the brake shoe 10 occupies a position relatively close to the periphery of the wheel 6, and when the operating lever 19 is moved outwardly to the dotted line position in said figure, the brake shoe is applied to the periphery of said wheel. By moving the lever 19 rearwardly and engaging the flange 40 in the notch 41, whereby the said lever is held in the rearward position, and by moving the lever 22 to the forward position, as represented in Fig. 3, the brake shoe 10 will occupy the wide clearance position. Now, in order to make ready to apply the brake quickly when desired, the lever 22 will be moved rearwardly and its flange 37 engaged in the notch 36, whereby the brake shoe 10 will be moved closer to the wheel 6, so that the same may be instantly applied by operation of the lever 19. This is accomplished by moving said lever forwardly.

When the lever 22 is moved rearwardly, the lower extremity of the lever 19 is actuated outwardly, whereby the rod 17 is moved forwardly, which in turn acts upon the lever 13 to actuate the brake shoe 10 closer to the periphery of the wheel 6. Then, when the lever 22 is secured in its rearward position, outward movement of the lever 19 will result in moving the rod 17 still farther forward, which in turn acts upon the lever 13 to actuate the brake shoe 10 to its applied position.

The upper extremities of the levers 19 and 22 are turned outwardly at angles, as shown at 42, thereby forming parts which may be engaged by the foot of the vehicle driver for operating said levers.

While I have described and illustrated herein a specific form of my invention, it is understood that the same may be modified and varied without departing from the spirit of the invention or the scope of the appended claims.

Having thus described my invention, what I claim and desire to secure by Letters Patent is:

1. A device of the class described, comprising two levers, one of said levers being fulcrumed intermediate its extremities, the other lever being fulcrumed at its lower extremity to the lower extremity of said first named lever, and a connection between said second named lever and the brake.

2. The combination with a brake for vehicles, of means for operating said brake, comprising two levers, one of said levers being fulcrumed intermediate its extremities to the body of the vehicle, the other lever being fulcrumed at its lower extremity to the lower extremity of the first named lever, and a connection between the second named lever and the brake.

3. The combination with a brake for vehicles, of means for operating said brake, comprising two levers, one of said levers being fulcrumed intermediate its extremities to the body of the vehicle, the other lever being fulcrumed at its lower extremity to the lower extremity of said first named lever, a connection between said second named lever and the brake, and means for holding said levers in any predetermined position of movement, substantially as described.

In testimony whereof, I affix my signature in the presence of two witnesses.

CHARLES F. GODDARD.

Witnesses:
  PAULINE L. POWELL,
  JNO. G. POWELL.